(12) United States Patent
Eisenberg et al.

(10) Patent No.: US 8,229,801 B2
(45) Date of Patent: Jul. 24, 2012

(54) METHOD AND SYSTEM OF TRACKING HOTEL LINEN PRODUCTS

(76) Inventors: Jonathan Eisenberg, Miami, FL (US); William Serbin, Miami, FL (US)

( * ) Notice: Subject to any disclaimer, the term of this patent is extended or adjusted under 35 U.S.C. 154(b) by 483 days.

(21) Appl. No.: 12/239,840

(22) Filed: Sep. 29, 2008

(65) Prior Publication Data
US 2010/0082457 A1    Apr. 1, 2010

(51) Int. Cl.
*G06Q 10/00* (2012.01)
(52) U.S. Cl. .......................................... 705/28
(58) Field of Classification Search .................. None
See application file for complete search history.

(56) References Cited

U.S. PATENT DOCUMENTS

| | | | | |
|---|---|---|---|---|
| 5,926,799 A * | 7/1999 | Robinson | ................ | 705/28 |
| 2002/0111819 A1* | 8/2002 | Li et al. | ................ | 705/1 |
| 2009/0024584 A1* | 1/2009 | Dharap et al. | ................ | 707/3 |
| 2010/0066497 A1* | 3/2010 | Lim et al. | ................ | 340/10.1 |

\* cited by examiner

*Primary Examiner* — Faris Almatrahi

(57) ABSTRACT

A tracking system for tracking hotel linen includes a tracking control, a plurality of check points setting at different key locations in a hotel respectively to communicatively link with the tracking control, and a plurality of identification tags arranged for permanently affixing at a plurality of hotel linen products respectively. Each of the identification tags contains a unique code preset by the tracking control to wirelessly communicate with each of the check points. Therefore, when each of the hotel linen products is moved to one of the check points, the corresponding identification tag is registered thereat. A tracking record is generated in the tracking control for the hotel linen products in responsive to each of the check points to monitor and manage the hotel linen products so as to greatly improve linen utilization in the hotel.

30 Claims, 4 Drawing Sheets

METHOD AND SYSTEM OF TRACKING HOTEL LINEN PRODUCTS

BACKGROUND

1. Field of the Invention

The present invention relates to a tracking system. More particularly, the method and system of tracking hotel moveable assets, including hotel linen products, such as sheets, towels, and bathrobes, efficiently in order to enhance the guest experience and to simplify the inventory management process in the hotel environment.

2. Discussion of the Related Art

In the United States, there are over 10,000 hotels of various sizes. One of the largest expenses of room occupancy is operating supplies. Major hotel brands are operating without knowing what the true cost of these supplies are. Some hotels are utilizing on-site laundry facilities, while other are outsourcing. Both have limited control of their linen and other supplies. Linen inventories of many properties are shrinking due to laundry damage, theft by guests, and staff and not to mention normal wear and tear. In today's competitive businesses, luxury hotels and resorts depend upon room presentation to raise the guest expectation and gain the competitive advantage.

Hotel owners and operators are aggressively searching for the means to positively impact the bottom line while saving resources and streamlining productivity. There is a growing desire for a linen tracking system that automatically tracks soiled and clean linen items continuously through the linen life cycle. It is desirable to lower the quantity of buffer linen stock (par levels) at hotels while also achieving predetermined service quality standards.

The disadvantages of existing linen management techniques are numerous, including: the inability to count soiled linen, in-house laundry problems, linen sent to outside laundry services are not returned, possibility of pilferages and losses, and the uncertainty in projecting short and long term linen stock levels and finally linen shortage causing customer dissatisfaction.

Uncertainty in arriving stocks levels result in high buffering costs. With such uncertainty, it is difficult to anticipate and plan for optimal linen operations. Many hotels have had to purchase additional stocks of linen to anticipate these daily shortages in an attempt to address this uncertainty. Currently, it is estimated that more than 4 par levels of linen stocks is kept (3 par stock is optimal), increasing the yearly capital expenditure spent on linen.

Resource waste may occur by attempting to resolve linen discrepancies. Such resolution requires significant effect from housekeeping and laundry personnel. Therefore, attention is often diverted from the primary purpose of providing both a high quality linen presentation and offering superior service that high pay hotel guest expect. Opportunity costs include the labor and the often expedited transportation costs that are incurred to rectify the daily discrepancies in linen operations.

In other words, the existing linen management has the following drawbacks.

(1) No knowledge of the life cycle of their linen.

(2) No way to monitor the cost of laundry operations and the effect on the environment.

(3) No way to effectively track discarded and unaccountable items.

(4) No way to insure consistent quality products.

(5) No effective way to track linen as it is processed through the laundry system.

BRIEF SUMMARY OF THE INVENTION

The present invention overcomes the above mentioned drawbacks and limitation by providing a method and system of tracking hotel moveable assets.

Early assessments of various hotels have shown an overwhelming desire for the benefits that can be realized from "Linentracker" resource tracking and monitoring system's capability. The system of the present invention enable hotels to significantly increase their effectiveness by streamlining the flow of thousands of expensive, portable, pieces of linen such as sheets, towels, and bathrobes. Hotels perceive the ability to greatly improve linen utilization and increase their ability to meet guest satisfaction goals.

The primary objective of the present invention is that the tracking system is adapted to monitor the movable assets "live" as the assets travel throughout the property, giving key managers complete control.

Another objective of the present invention is that the tracking system will take into account linen and laundry costs, operating efficiency and productivity, as well as guest, staff, and management satisfaction.

Another objective of the present invention is that the tracking system comprises a tracking control communicatively linked with a plurality of check points at different key locations in a hotel, wherein a plurality of identification tags are permanently affixed at the hotel linen products respectively, such that when the hotel linen products are moved to one of the check points, the corresponding identification tags are registered thereat. Therefore, the tracking control is able to monitor and manage the hotel linen products so as to greatly improve linen utilization in the hotel.

Another objective of the present invention is that the tracking system and method is able to keep track with the life cycle of each of the hotel linen products and insure consistent quality products.

Another objective of the present invention is that the tracking system and method is able to keep track the discarded and unaccountable hotel linen products.

Another objective of the present invention is to provide a system and method of tracking hotel linen products, wherein Radio Frequency Identification (RFID) technology is a preferred solution that addresses this concern. The present invention will provide tracking and monitoring of operating supplies, moveable assets, equipment and staff, to enhance the quality of guest services and increase efficiency and productivity, while at the same time reducing operating costs.

Another objective of the present invention is that the system does not store or collect information that is personal in nature. The only information available through the system is the type of linen and the quantity available within a location at a specific property.

Another objective of the present invention is that the system will not communicate to any system to facilitate the transfer of any Malware software or data. In addition, it will be able to abide by the standards of protection required including resident protection and periodic scanning.

The preferred embodiment is a method of tracking hotel linen, comprising the steps of:

(a) communicatively linking a plurality of identification tags with a tracking control in a wireless connection manner;

(b) permanently affixing the identification tags at a plurality of hotel linen products respectively;

(c) setting a plurality of check points at different key locations in a hotel respectively to communicatively link with the tracking control, wherein when each of the hotel linen products is moved to one of the check points, the corresponding identification tag is registered thereat; and (d) generating a tracking record for the hotel linen products in responsive to each of the check points to monitor and manage the hotel linen products so as to greatly improve linen utilization in the hotel.

The present invention further provides a tracking system for tracking hotel linen, comprising, a tracking control, a plurality of check points setting at different key locations in a hotel respectively to communicatively link with the tracking control, and a plurality of identification tags arranged for permanently affixing at a plurality of hotel linen products respectively.

Each of the identification tags contains a unique code preset by the tracking control to wirelessly communicate with each of the check points, wherein when each of the hotel linen products is moved to one of the check points, the corresponding identification tag is registered thereat. Accordingly, a tracking record is generated in the tracking control for the hotel linen products in responsive to each of the check points to monitor and manage the hotel linen products so as to greatly improve linen utilization in the hotel.

For a more complete understanding of the present invention with its objectives and distinctive features and advantages, reference is now made to the following specification and to the accompanying drawings.

BRIEF DESCRIPTION OF THE DRAWING(S)

DETAILED DESCRIPTION OF THE INVENTION

Figure 1:
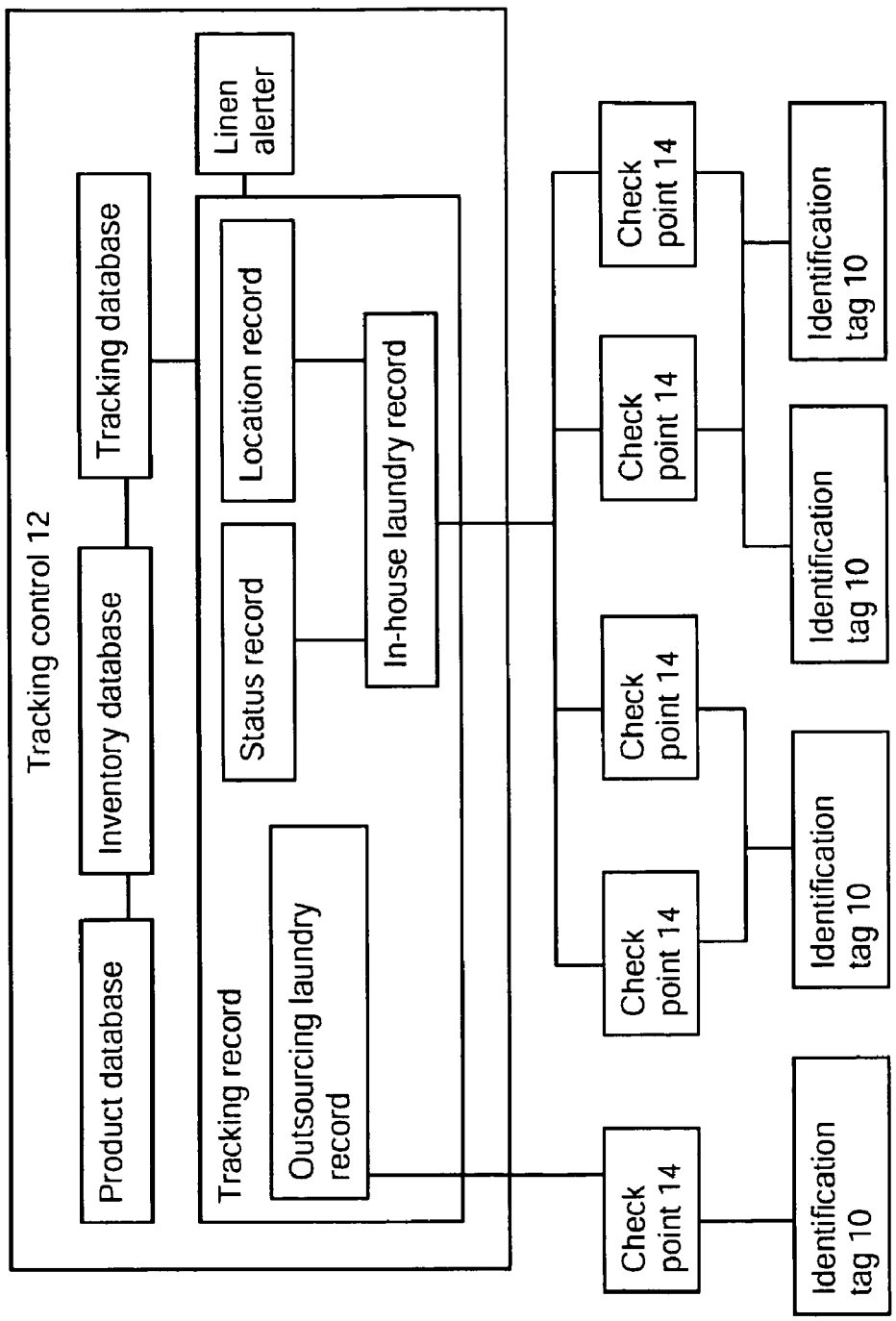
FIG. 1 is a block diagram of the tracking system in accordance with the present invention.
Figure 2:
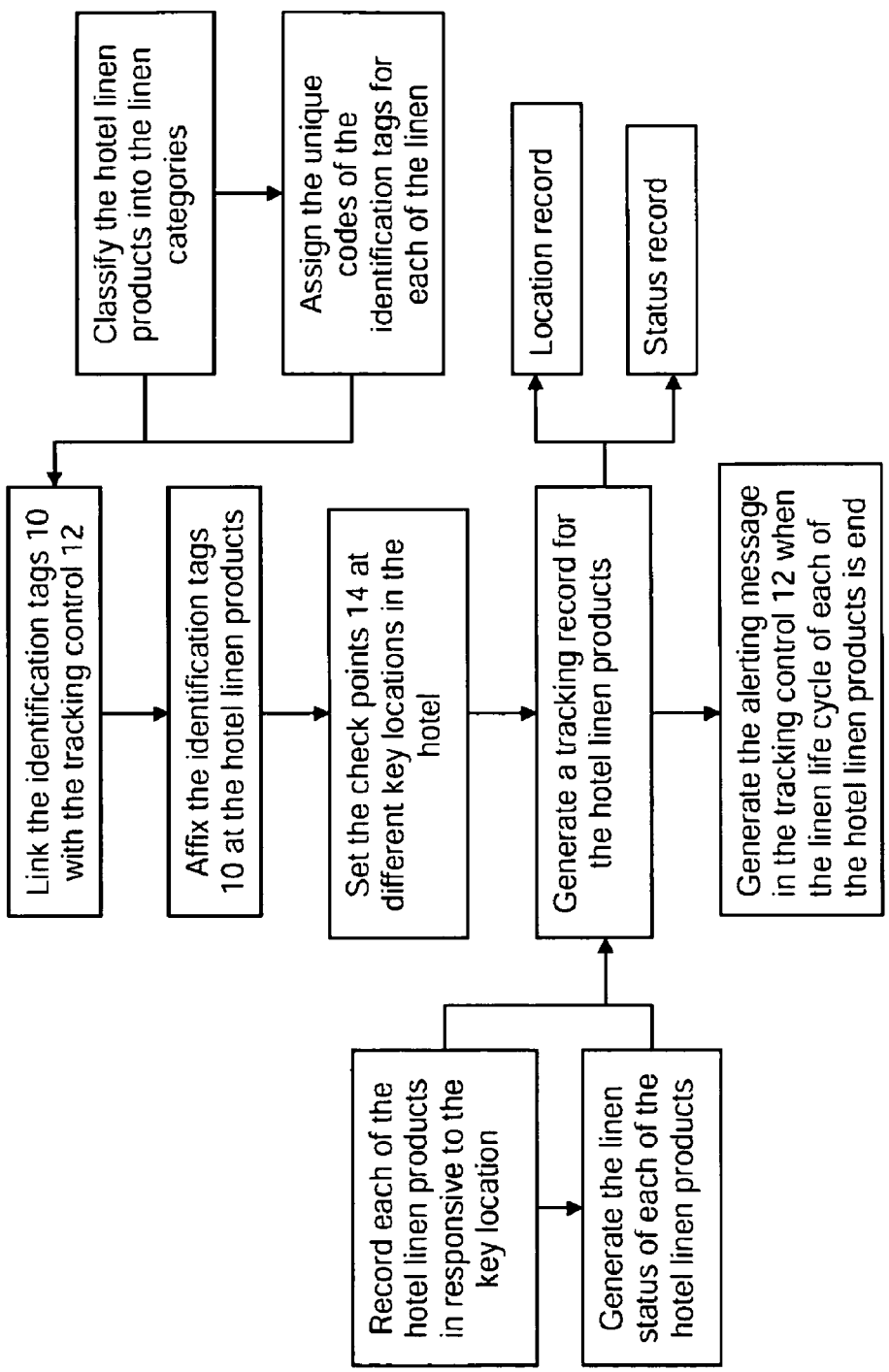
FIG. 2 is a flow diagram of a tracking method in accordance with the present invention.

Referring to FIGS. 1 and 2, a system and method of tracking hotel linen products in accordance with the present invention are illustrated, wherein the present enable hotels to significantly increase their effectiveness by streamlining the flow of thousands of expensive portable, pieces of linen such as sheets, towels, and bathrobes. Hotels perceive the ability to greatly improve linen utilization and increase their ability to meet guest satisfaction goals. Accordingly, the linen products include pillow cases, pillow shams, pillow protectors, pillows, flat sheets, fitted sheets, duvet covers, duvet inserts, blankets, mattress pads, mattress protectors, feather beds, bed spreads, bed skirts, wash cloth, hand towels, bath towels, bath sheets, bath mats, pool towels, lounge chair covers, fitness towels, bathrobes, etc. The above examples are merely intended to assist the reader in understanding some of the terms described herein. They are not intended, in any manner, to limit the scope of the tracking system for the hotel moveable assets.

FIG. 1 depicts the tracking system of the present invention, which comprises a tracking control 12, a plurality of check points 14 setting at different key locations in a hotel respectively, and a plurality of identification tags 10, wherein each of the identification tags 10 contains a unique code preset by said tracking control 12.

FIG. 2 depicts the method which comprises the following steps.

(1) Communicatively link the identification tags 10 with the tracking control 12 in a wireless connection manner.

(2) Permanently affix the identification tags 10 at a plurality of hotel linen products respectively.

(3) Set the check points 14 at different key locations in the hotel respectively to communicatively link with the tracking control 12, wherein when each of the hotel linen products is moved to one of the check points 14, the corresponding identification tag 10 is registered thereat.

(4) Generate a tracking record for the hotel linen products in responsive to each of the check points 14 to monitor and manage the hotel linen products so as to greatly improve linen utilization in the hotel.

The tracking control 12 is a main control that incorporates with a server (stand alone) computer being installed in a desired location, such as laundry manager's office, wherein the data will be accesses. The hotel operator is able to track and monitor the inventories of hotel linen products through the tracking control 12. In particularly, the hotel operators will have the opportunity to access the tracking control 12 through an Internet enabled computer by secure login to the tracking control 12. The tracking control 12 can also be remotely monitored by the assigned hotel operators.

The system of the present invention is designed around using RFID technology to identify the hotel linen products within the hotel. The RFID technology component comprises a microchip that has an ID and RFID readers/antennas that can receive the ID as a radio signal from the microchip to identify the microchip. The system is fully FCC compliant. The architecture of the system is designed to have RFID antennas listening to RFID microchips at the key locations within the hotel. This will allow the system to compile inventory information of the hotel linen products that will be available for property managers to review and understand utilization information. The system works within a self contained network and does not have to connect to the corporate network for any information.

In the preferred embodiment, the identification tags 10 are RFID tags wirelessly read at each of the check points 14 using radio waves. Each of the identification tags 10 is affixed to an edge portion of the hotel linen product. Accordingly, for existing lien inventories, a special encapsulated programmed RFID tag is affixed to all hotel linen on property. Preferably, a static IP address is assigned to each of the check points 14 so the RFID data thereat will be transferred through the guess WiFi network.

Figure 3:
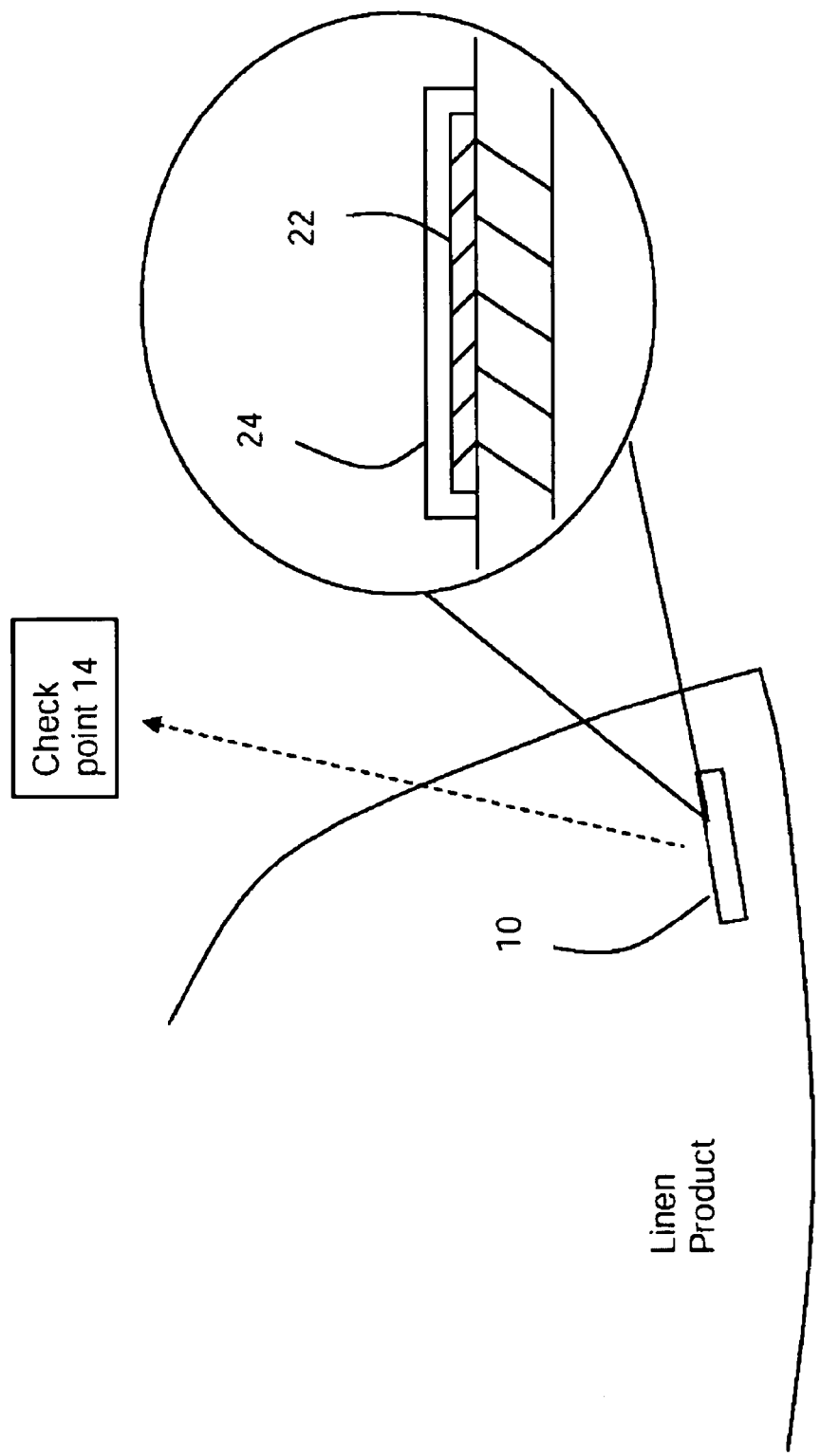
FIG. 3 is a schematic view to show the structure of the identification tag in accordance with the present invention.

FIG. 3 depicts each of the identification tags 10 comprising a microchip 22 adapted to be registered with each of the check points 14 in a wirelessly communicating manner, and a protection sleeve 24, which is made of waterproof and heat resistant material, containing the microchip 22 therein, wherein the protection sleeve 24 is sealed and affixed to each of the hotel linen products to retain the microchip 22 thereat and to protect the microchip 22 for laundry process. Preferably, the protection sleeve 24 is made of silicon to protect and retain the microchip 22 at the respective hotel linen product.

For software communication overview, the check points 14 as the RFID readers/antennas that receive signals from the microchips 22 of the identification tags 10 are Ethernet based devices that transmit the ID's collected from the microchips 22 to the tracking control 12 for storage and analysis. The tracking control 12 will periodically poll individual check points 14 for their inventory information. To facilitate this each check point 14 will have its individual Ethernet address to communicate. The system of the present invention will not access any corporate network, but rather leverage the existing WiFi network to communicate.

In addition, the check points 14 are set at the key locations of the hotel in responsive to linen closets, laundry shoot room and laundry sort areas in the hotel. In particularly, the cleaning process of the hotel linen products is that the hotel linen product passes into laundry machine, dryer, and press folder. Therefore, when the hotel linen products are moved to the linen closets, the check points thereof will read the identification tags 10 to track the quantity of the hotel linen products in the linen closets. Preferably, the check point 14 is also set at each of the hotel rooms to ensure the hotel linen products being replaced daily and to prevent the hotel linen products from being stolen. It is worth mentioning that the protection sleeve 24 will protect the microchip 22 from being damaged through the cleaning process of the hotel linen product.

For sorting out different kinds of hotel linen products, the method of the present invention, in the step (1), further comprises the following sub-steps.

(1-1) Classify the hotel linen products into a plurality of linen categories. Accordingly, the hotel linen products are classified, as an example, into a sheet category, a towel category, and a bathrobe category, etc. . . .

(1-2) Assign the unique codes of the identification tags for each of the linen categories.

In the preferred embodiment, the tracking control 12 comprises an inventory database for storing information of the hotel linen products with manufacture, style, size, cost, and date of manufacture. In addition, the tracking control 12 further comprises a tracking database and a product database storing information of the hotel linen products that the hotel linen products are classified into the linen categories.

Therefore, when each of the hotel linen products is read at one of the check points 14, the tracking control 12 not only identifies the hotel linen product in responsive to the key location 14 for tracking purpose but also manages the hotel linen product in responsive to the linen category for real-time monitoring inventory purpose.

For example, the check point 14 at the linen closet will read the hotel linen products with different unique codes of the identification tags 10. Therefore, the tracking control 12 is able to track the quantity of the sheets, towels, and bathrobes within the respective linen closet.

Figure 4:
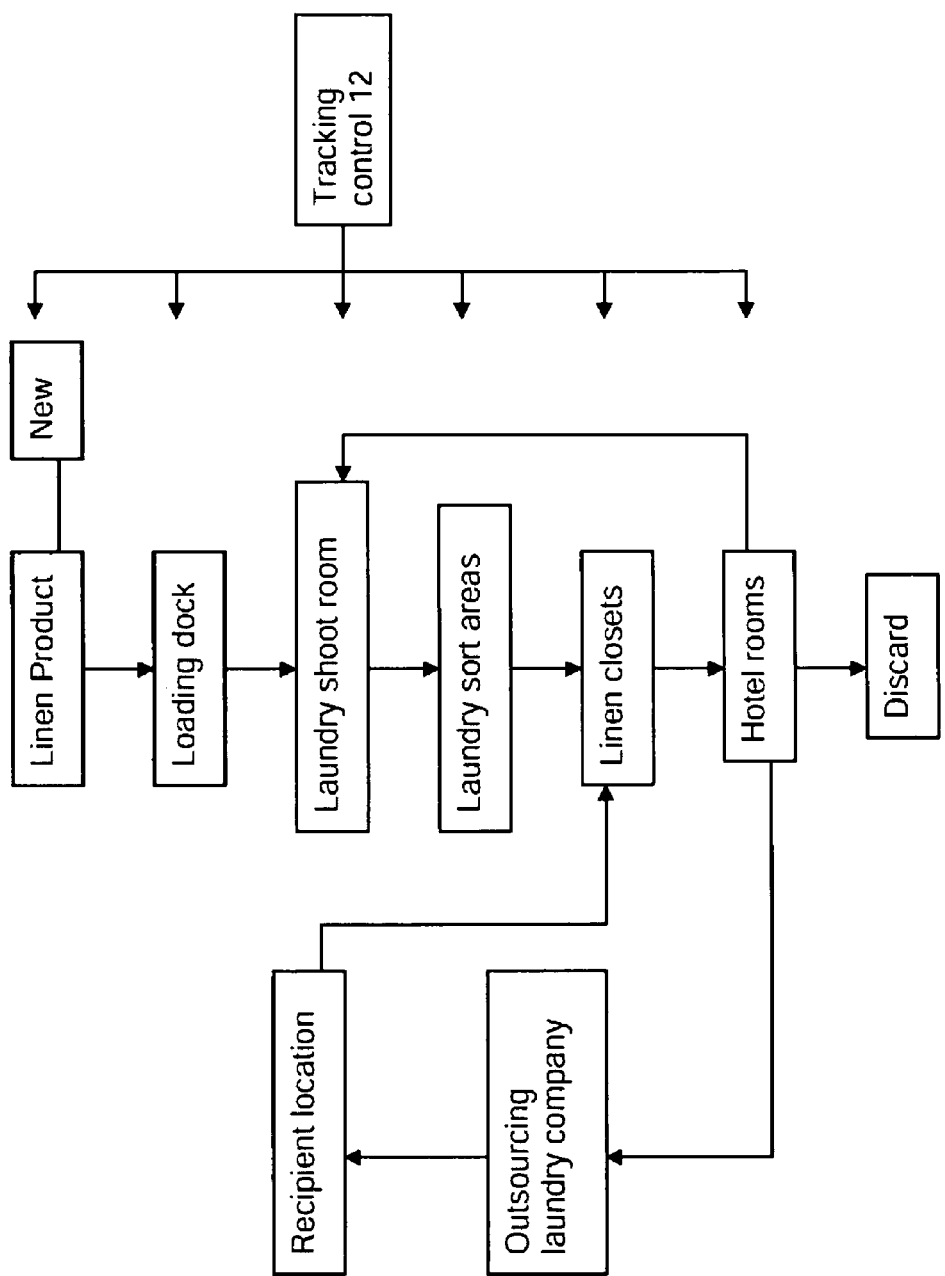
FIG. 4 depicts the routine of the hotel linen product through the tracking system in accordance with the present invention.

Having the check points 14 at different key locations of the hotel, the tracking control 10 is able to track the linen status of the hotel linen product as shown FIG. 4. When a new (embedded) linen product arrives at the loading dock of the hotel, it will pass through a scan field and the amount received is noted on the tracking control 10 as "received new". The tracking control 10 will indicate the quantity of new linen product in the hotel. The new linen product is then placed in the laundry shoot room or dirty linen sort area and the tracking control 10 will read dirty via the check points 14. Then, the linen product passes into laundry machine, dryer and press folder. Once the wash process is completed, the linen product will move back up to the linen closets on the floors. Upon its arrival in the linen closet to register with the check points 14 thereat, the tracking control 10 will automatically adjust the dirty status to clean status. In addition to clean-dirty status, the tracking control 10 will also provide location tracking via the check points 14 so the management will know the exact location of each linen product. In other words, the system will monitor the movements of all hotel linen products as they pass throughout the check points 14 of the hotel for complete real-time inventory management.

In responsive to track the linen status of the hotel linen product, the step (4) of the method of the present invention comprises the following sub-steps.

(4-1) Record each of the hotel linen products in responsive to the key location when the identification tag 10 is registered with the corresponding check point 14. Therefore, the tracking control 12 is able to keep track the quantity of the hotel linen products and the locations thereof at the respective check point 14.

(4-2) Generate the linen status of each of the hotel linen products in responsive to the key location to verify a condition of the hotel linen product. As it is mentioned, the status of hotel linen products at the laundry shoot room will be stated as dirty status. The status of hotel linen products at the linen closet will be stated as clean status.

Furthermore, the tracking record of the tracking control 12 contains a location record containing data of each of the hotel linen products in responsive to the key location when the identification tag 10 is registered with the corresponding check point 14, and a status record containing data of the linen status of each of the hotel linen products in responsive to the key location to verify the condition of the hotel linen product.

Since the hotel linen products must be discarded frequently due to laundry damage or normal wear and tear, each of the hotel linen products has its own linen life cycle preset in the tracking control 12. Therefore, the hotel operator must discard the damaged hotel linen product once the linen life cycle thereof is end. Accordingly, the tracking control 12 comprises a linen alerter communicatively linked to the tracking record to keep track the linen life cycle of each of the hotel linen products, wherein the linen alerter generates an alerting message in the tracking control 12 when the linen life cycle of each of the hotel linen products is end for enhancing a quality control of the hotel linen products and for achieving high service quality standards for guests in the hotel. Correspondingly, the method should also contain a step of generating the alerting message in the tracking control 12 when the linen life cycle of each of the hotel linen products is end. For example, a bed sheet is set in the tracking control 12 to have 50 laundry cycles. Once the bed sheet passes through the check point 14 at the laundry shoot room for 50 times, the tracking control 12 will generate the alerting message for discarding the bed sheet.

Accordingly, some hotels are utilizing on-site laundry facilities, while other are outsourcing. The present invention is able to keep track the hotel linen products through both the on-site laundry facility and outsourcing laundry facility. The tracking record further contains an in-house laundry record for tracking the hotel linen products through an in-house laundry process in responsive to the different check points, and an outsourcing laundry record for tracking the hotel linen products in outsourcing laundry manner. The in-house laundry record will provide all statuses of the hotel linen products through the above mentioned clean process. The outsourcing laundry record will provide the dirty status of the hotel linen products and will record the quantity and the send-out date of the dirty hotel linen products. The outsourcing laundry record also provides the information of the outsourcing laundry company and a projected delivery date of the hotel linen products. Once the hotel linen products are cleaned and returned back to the hotel, the hotel linen products are registered at the check point 14 of the recipient location of the hotel. The tracking control 12 will verify the unique codes of the identification tags 10 of the sent hotel linen products with the unique codes of the identification tags 10 of the returned hotel linen products. Then, the returned hotel linen products will be sent back to the linen closets to update the linen status of the hotel linen products.

The present invention will provide personally identifiable information protection. The system of the present invention does not store or collect information that is personal in nature. The only information available through the system is the type of linen product and the quantity available within the key location at the hotel. The identification tag 10 only carries the unique code that identifies the linen product. This unique code is the only data that is transferred from the check point 14 to the tracking control 12. In this capacity, external scanning of the identification tag 10 will not provide any information either about the linen product or its history.

For malware protection, the system of the present invention will not communicate to any system to facilitate the transfer of any Malware software or data. In addition, the present invention will be able to abide by the standards of protection required including resident protection and periodic scanning.

While the embodiments and alternatives of the present invention have been shown and described, it will be apparent to one skilled in the art that various other changes and modifications can be made without departing from the spirit and scope of the present invention.

What is claimed is:

1. A method of tracking hotel linen, comprising the steps of:
   (a) communicatively linking a plurality of identification tags with a tracking control in a wireless connection manner, wherein each of said identification tags contains a unique code preset by said tracking control;
   (b) permanently affixing said identification tags at a plurality of hotel linen products respectively;
   (c) setting a plurality of check points at different fixed key locations in a hotel respectively to communicatively link with said tracking control, wherein when each of said hotel linen products is moved to one of said check points, said corresponding identification tag is registered thereat;
   (d) automatically generating a tracking record for said hotel linen products in responsive to each of said check points when said identification tag is registered at said corresponding check point to monitor and manage said hotel linen products and to ensure said hotel linen products being replaced daily, wherein the step (d) further comprises the steps of:
      (d.1) real-time checking a linen status of each of said hotel linen products in responsive to key location; and
      (d-2) generating said linen status of each of said hotel linen products to automatically verify a condition of said hotel linen product, wherein when said hotel linen product is in cleaning process, said linen status of said hotel linen product is indicated as "dirty" status, when said hotel linen product is in storage process, said linen status of said hotel linen product is indicated as "clean" status; and
   (e) keep tracking a linen life cycle of each of said hotel linen products for ensuring said respective hotel product being discard once said linen life cycle is end.

2. The method of claim 1 wherein said identification tags are RFID tags wirelessly read at each of said check points using radio waves.

3. The method of claim 1 wherein the step (a) comprises the sub-steps of: (a-1) classifying said hotel linen products into a plurality of linen categories; and (a-2) assigning said unique codes of said identification tags for each of said linen categories; wherein when each of said hotel linen products is read at one of said check points, said tracking control not only identifies said hotel linen product in responsive to said key location for tracking purpose but also manages said hotel linen product in responsive to said linen category for real-time monitoring inventory purpose.

4. The method of claim 2 wherein the step (a) comprises the sub-steps of: (a-1) classifying said hotel linen products into a plurality of linen categories; and (a-2) assigning said unique codes of said identification tags for each of said linen categories; wherein when each of said hotel linen products is read at one of said check points, said tracking control not only identifies said hotel linen product in responsive to said key location for tracking purpose but also manages said hotel linen product in responsive to said linen category for real-time monitoring inventory purpose.

5. The method of claim 1 wherein the step (d) further comprises a step of recording said linen status of each of said hotel linen products in responsive to said key location when said identification tag is registered with said corresponding check point until said linen life cycle of said hotel linen product is end.

6. The method of claim 1 wherein the step (d) further comprises a step of recording said linen status of each of said hotel linen products in responsive to said key location when said identification tag is registered with said corresponding check point until said linen life cycle of said hotel linen product is end.

7. The method of claim 1 further comprising a step of generating an alerting message in said tracking control when said linen life cycle of each of said hotel linen products is end, so as to enhance a quality control of said hotel linen products and to achieve high service quality standards for guests in said hotel.

8. The method of claim 6 further comprising a step of generating an alerting message in said tracking control when said linen life cycle of each of said hotel linen products is end, so as to enhance a quality control of said hotel linen products and to achieve high service quality standards for guests in said hotel.

9. The method of claim 1 wherein said check points are set at said key locations of said hotel in responsive to hotel rooms, linen closets, laundry room and laundry sort areas in said hotel.

10. The method of claim 8 wherein said check points are set at said key locations of said hotel in responsive to hotel rooms, linen closets, laundry room and laundry sort areas in said hotel.

11. The method of claim 1 wherein, in the step (d), said tracking record contains an in-house laundry record for tracking said hotel linen products through an in-house laundry process in responsive to said different check points, and an outsourcing laundry record for tracking said hotel linen products in outsourcing laundry manner.

12. The method of claim 10 wherein, in the step (d), said tracking record contains an in-house laundry record for tracking said hotel linen products through an in-house laundry process in responsive to said different check points, and an outsourcing laundry record for tracking said hotel linen products in outsourcing laundry manner.

13. The method of claim 1 wherein said tracking control comprises an inventory database storing information of said hotel linen products with manufacture, style, size, cost, and date of manufacture.

14. The method of claim 12 wherein said tracking control comprises an inventory database storing information of said hotel linen products with manufacture, style, size, cost, and date of manufacture.

15. The method of claim 1 wherein each of said identification tags comprises a microchip adapted to be registered with each of said check points in a wirelessly communicating manner, and a protection sleeve, which is made of waterproof and heat resistant material, containing said microchip therein, wherein said protection sleeve is sealed and affixed to each of said hotel linen products to retain said microchip thereat and to protect said microchip.

16. The method of claim 14 wherein each of said identification tags comprises a microchip adapted to be registered with each of said check points in a wirelessly communicating manner, and a protection sleeve, which is made of waterproof and heat resistant material, containing said microchip therein, wherein said protection sleeve is sealed and affixed to each of said hotel linen products to retain said microchip thereat and to protect said microchip.

17. A tracking system for tracking hotel linen, comprising:
a tracking control;
a plurality of check points setting at different fixed key locations in a hotel respectively to communicatively link with said tracking control; and
a plurality of identification tags arranged for permanently affixing at a plurality of hotel linen products respectively, wherein each of said identification tags contains a unique code preset by said tracking control to wirelessly communicate with each of said check points, wherein when each of said hotel linen products is moved to one of said check points, said corresponding identification tag is registered thereat,
wherein said track control real-time checks a linen status of each of said hotel linen products in responsive to key location for ensuring said hotel linen products being replaced daily and generates said linen status of each of said hotel linen products to automatically verify a condition of said hotel linen product, wherein when said hotel linen product is in cleaning process, said linen status of said hotel linen product is indicated as "dirty" status, wherein when said hotel linen product is in storage process, said linen status of said hotel linen product is indicated as "clean" status, wherein a tracking record is generated in said tracking control for said hotel linen products in responsive to each of said check points to monitor and manage said hotel linen products so as to greatly improve linen utilization in said hotel.

18. The tracking system of claim 17 wherein said identification tags are RFID tags wirelessly read at each of said check points using radio waves.

19. The tracking system of claim 17 wherein said check points are set at said key locations of said hotel in responsive to hotel rooms, linen closets, laundry room and laundry sort areas in said hotel.

20. The tracking system of claim 18 wherein said check points are set at said key locations of said hotel in responsive to hotel rooms, linen closets, laundry room and laundry sort areas in said hotel.

21. The tracking system of claim 17 wherein each of said identification tags comprises a microchip adapted to be registered with each of said check points in a wirelessly communicating manner, and a protection sleeve, which is made of waterproof and heat resistant material, containing said microchip therein, wherein said protection sleeve is sealed and affixed to each of said hotel linen products to retain said microchip thereat and to protect said microchip.

22. The tracking system of claim 20 wherein each of said identification tags comprises a microchip adapted to be registered with each of said check points in a wirelessly communicating manner, and a protection sleeve, which is made of waterproof and heat resistant material, containing said microchip therein, wherein said protection sleeve is sealed and affixed to each of said hotel linen products to retain said microchip thereat and to protect said microchip.

23. The tracking system of claim 17 wherein said tracking control comprises a linen alerter communicatively linked to said tracking record to keep track a linen life cycle of each of said hotel linen products, wherein said linen alerter generates an alerting message in said tracking control when said linen life cycle of each of said hotel linen products is end for enhancing a quality control of said hotel linen products and for achieving high service quality standards for guests in said hotel.

24. The tracking system of claim 22 wherein said tracking control comprises a linen alerter communicatively linked to said tracking record to keep track a linen life cycle of each of said hotel linen products, wherein said linen alerter generates an alerting message in said tracking control when said linen life cycle of each of said hotel linen products is end for enhancing a quality control of said hotel linen products and for achieving high service quality standards for guests in said hotel.

25. The tracking system of claim 17 wherein said tracking control comprises a tracking database and a product database storing information of said hotel linen products that said hotel linen products are classified into a plurality of linen categories, wherein said unique codes of said identification tags are assigned for each of said linen categories, such that when each of said hotel linen products is read at one of said check points, said tracking control not only identifies said hotel linen product in responsive to said key location for tracking purpose in said tracking database but also manages said hotel linen product in responsive to said linen category for real-time monitoring inventory purpose.

26. The tracking system of claim 24 wherein said tracking control comprises a tracking database and a product database storing information of said hotel linen products that said hotel linen products are classified into a plurality of linen categories, wherein said unique codes of said identification tags are assigned for each of said linen categories, such that when each of said hotel linen products is read at one of said check points, said tracking control not only identifies said hotel linen product in responsive to said key location for tracking purpose in said tracking database but also manages said hotel linen product in responsive to said linen category for real-time monitoring inventory purpose.

27. The tracking system of claim 17 wherein said tracking record contains a location record containing data of said linen status of each of said hotel linen products in responsive to said key location when said identification tag is registered with said corresponding check point.

28. The tracking system of claim 26 wherein said tracking record contains a location record containing data of said linen status of each of said hotel linen products in responsive to said key location when said identification tag is registered with said corresponding check point.

29. The tracking system of claim 27 wherein said tracking record further contains an in-house laundry record for tracking said hotel linen products through an in-house laundry process in responsive to said different check points, and an outsourcing laundry record for tracking said hotel linen products in outsourcing laundry manner.

30. The tracking system of claim 28 wherein said tracking record further contains an in-house laundry record for tracking said hotel linen products through an in-house laundry process in responsive to said different check points, and an outsourcing laundry record for tracking said hotel linen products in outsourcing laundry manner.

* * * * *